J. R. GAMMETER.
BEAD FOR TIRES.
APPLICATION FILED SEPT. 3, 1912.
1,180,390.
Patented Apr. 25, 1916.
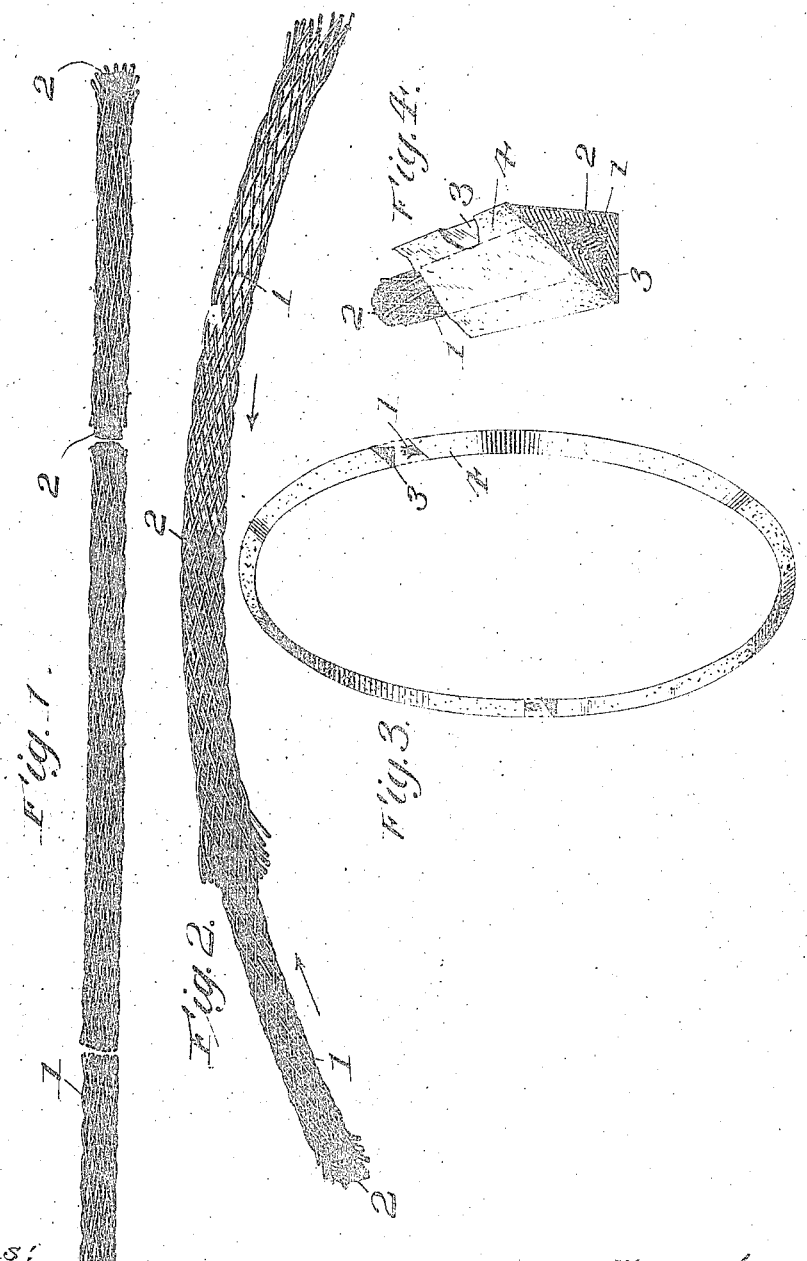

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

BEAD FOR TIRES.

1,180,590.　　　Specification of Letters Patent.　　Patented Apr. 25, 1916.

Original application filed December 19, 1911, Serial No. 666,648. Divided and this application filed September 3, 1912. Serial No. 718,310.

*To all whom it may concern:*

Be it known that I, JOHN R. GAMMETER, a citizen of the United States, residing at Akron, in the county of Summit and State of Ohio, have invented certain new and useful Improvements in Beads for Tires, of which the following is a specification.

My present invention pertains to an improved bead for tires, the construction and advantages of which will be hereinafter more fully set forth.

The invention is illustrated in the accompanying drawings, wherein:

Figure 1 is an elevation of a portion of the tubular wire fabric and the inclosed rubber core which go to form the main body and strengthening element of the bead; Fig. 2 is a similar view, the tubular fabric being shown as partly telescoped or "swallowed"; Fig. 3 is a perspective view of the completed bead; and Fig. 4 is a section of the bead, shown on a somewhat larger scale.

The main object of the present invention is to produce a bead structure in which the wire strengthening element is substantially continuous, it being formed from a continuous tubular structure which is telescoped within itself, so as to produce a complete annulus, the various layers of which interlock with each other and thus prevent slipping and elongation of the structure as a whole.

A further object of the invention is to provide a core-piece for the metallic member, which, when vulcanized, becomes hard, and by reason of the pressure exerted by the molds is forced outwardly into and through the meshes of the various superincumbent layers of the tubular wire fabric, interlocking such layers, and being likewise autogenously joined to the outer layers of rubber or rubber fabric which are placed about the metallic element.

Assuming, for instance, that it be desired to produce a 30-inch bead, one takes a piece of tubular wire braid 1, 24 feet long, and inserts therein, at one end, a piece of unvulcanized india rubber 2, approximately nine feet long, after which the tubular fabric is telescoped or caused to swallow itself in the manner indicated in Fig. 2. This action is continued until the ends of the rubber core 2 abut, at which time the annulus formed by the superincumbent layers of tubular woven wire fabric will have a diameter slightly less than the desired diameter of the finished bead. The mesh of the braided wire tube is quite open or braided with a long pitch, so that when the metallic element thus produced is surrounded or embedded in a body of rubber 3, which is preferably covered by a layer of cloth 4, see Fig. 4, and the whole subjected to pressure and vulcanization in a suitable mold, the braid will lengthen slightly, reaching its limit of elongation at the desired diameter of the bead. The various wires of the superincumbent layers tend to interlock somewhat, even before the bead is vulcanized, and when subjected to pressure and the rubber core 2 is cured and becomes hard after having passed to a greater or less extent into the meshes of the wire fabric, said fabric becomes thoroughly interlocked throughout, and in effect is a continuous member, without joint. The construction, while being strong and firm, moreover places an equal, or substantially equal, strain upon the various wires throughout, whereby each wire is made to take its proper share of the strain. Under actual test it has been found impossible to cause the layers of the tubular wire fabric, after the parts are vulcanized, to slip on each other; consequently, there can be no elongation of the bead from that cause. Furthermore, no elongation can result by reason of stretching of the wire fabric, as the stretch is taken out as the bead is slightly enlarged when placed and cured within the mold.

No claim is herein made for the method of producing beads such as above described, as the same forms the subject-matter of my co-pending application Serial No. 666,648, filed on the 19th day of December, 1911, of which this application is a division.

Having thus described my invention, what I claim is:

1. A bead for tires, comprising an annulus formed of a tubular wire fabric telescoped upon itself to produce a plurality of superposed layers, said annulus being embedded in a body of rubber.

2. A bead for tires, comprising an annulus formed of a tubular braided wire fabric, having a core of relatively hard rubber within the same, and surrounded by a body of rubber, said rubber portions being autogenously connected.

3. A bead for tires comprising an annulus formed from a continuous piece of tubular braided wire fabric telescoped upon itself so as to produce a plurality of superposed layers; a core of relatively hard rubber within the annulus; and a layer of rubber surrounding the annulus, said core and layer being autogenously connected and embedding the wire fabric.

4. An annulus for tire beads, comprising a tubular braided wire fabric telescoped upon itself and producing a series of superposed layers, the wires of one layer interlocking with the wires forming the meshes of the adjacent layer.

5. An annulus for tire beads, comprising an open mesh, tubular, braided wire fabric telescoped upon itself and producing a series of superposed layers, the wires of one layer interlocking with the wires forming the meshes of the adjacent layer and acting to prevent separation when placed under stress.

6. An annulus for tire beads, comprisng an open-mesh, tubular, braided wire fabric telescoped upon itself and producing a series of superposed layers, the wires of one layer interlocking with the wires forming the meshes of the adjacent layer and acting to prevent separation when placed under stress; and a filling of hard rubber passing outwardly into the meshes of the fabric.

In testimony whereof I have signed my name to this specification in the presence of two subscribing witnesses.

JOHN R. GAMMETER.

Witnesses:
WALTER K. MEKUS,
ILLA N. KIRN.